United States Patent Office 3,207,759
Patented Sept. 21, 1965

3,207,759
ISOQUINOLINE ACETAMIDES AND ACETONITRILES
Martha Mabel Creighton and Willy Leimgruber, Nutley, and Wilhelm Wenner, Upper Montclair, N.J., assignors to Hoffmann-La Roche Inc., Nutley, N.J., a corporation of New Jersey
No Drawing. Filed Aug. 1, 1962, Ser. No. 213,908
8 Claims. (Cl. 260—283)

This invention is concerned with a new class of chemical compounds, namely 3,4-dihydro-$\Delta^{1(2H),\alpha}$-isoquinolineacetamides and 3,4,5,6,7,8-hexahydro-$\Delta^{1(2H),\alpha}$-isoquinolineacetamides. The invention also relates to certain novel intermediates and methods of synthesis therefor. More specifically the compounds of the invention are selected from the group consisting of compounds of the formulae

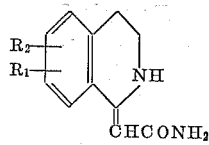

and

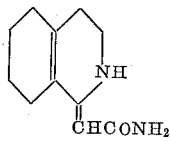

and acid addition salts thereof; wherein $R_1$ and $R_2$ are each selected from the group consisting of hydrogen, lower alkoxy, lower alkyl and, taken together, lower alkylenedioxy.

Formula I is illustrative of 3,4-dihydro-$\Delta^{1(2H),\alpha}$-isoquinolineacetamides whereas Formula II is illustrative of 3,4,5,6,7,8 - hexahydro - $\Delta^{1(2H),\alpha}$-isoquinolineacetamides. The compounds of Formula II are 5,6,7,8-tetrahydro derivatives of the compounds of Formula I. These compounds form acid addition salts with both organic and inorganic acids. Thus, they form medicinally acceptable acid addition salts with pharmaceutically acceptable acids such as hydrochloric acid, hydrobromic acid, phosphoric acid, nitric acid, sulfuric acid, acetic acid, formic acid, maleic acid, p-toluenesulfonic acid, methanesulfonic acid, and the like. Moreover, whereas the double bond of the bicyclic products of Formula I and Formula II is exocyclic in nature, said double bond in the corresponding acid addition salts is endocyclic. Thus, the acid addition salts of the compounds of Formula I and Formula II possess respectively the following structures,

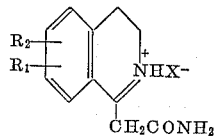

and

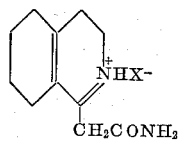

wherein $R_1$ and $R_2$ have the same meaning as above, and X is the anion of the acid from which the acid addition salt is formed.

As used above, the term lower alkyl refers to both straight and branched chain hydrocarbon groups such as methyl, ethyl, isopropyl, and the like. Similarly, the term lower alkoxy refers to groups such as methoxy, or the like, and the term lower alkylenedioxy refers to groups such as methylenedioxy, and the like.

The compounds of Formula I and Formula II are prepared from corresponding N-($\beta$-R$_3$-ethyl)-cyanoacetamides wherein R$_3$ is phenyl (in intermediates for compounds of Formula I) or 1-cyclo-hexen-1-yl (in intermediates for compounds of Formula II). These ethyl-cyanoacetamide intermediates can be ring closed by any one of several methods utilizing different ring closing agents. The selection of any one particular method is governed, at least in part, by the effect of the ring closing agent on parts of the starting material molecule which do not partake in the ring closure.

In one embodiment of the invention, ring closure is effected via treatment with polyphosphoric acid. This treatment simultaneously effects ring closure to the isoquinoline structure and hydration of the cyano group to carboxamide, and hence is a highly advantageous method for the synthesis of the compounds of this invention. Suitably, the reaction is conducted using polyphosphoric acid as the reaction medium. Inasmuch as polyphosphoric acid is a viscous liquid, an amount thereof should be used which is sufficient to enable the reaction mixture to be stirred so as to achieve even heat distribution and homogeneity of the reaction mixture. It has been found suitable to use the polyphosphoric acid in an amount 6 to 8 times the weight of the ethyl-cyanoacetamide reactant. Larger or smaller ratios could, of course, be used, but the above-mentioned one is preferred. The reaction can be effected at temperatures between about 50° C. and about 150° C. and is suitably conducted at a temperature between about 90° C. and about 120° C. preferably at about 110–120° C., and the reaction mixture is advantageously maintained at such an elevated temperature for between about 6 to about 18 hours. The ring closed product is obtained as a soluble polyphosphate which upon being mixed with water and basified yields the crystalline base.

In another method of preparing the products of Formula I and Formula II, the N-($\beta$-R$_3$-ethyl)-cyano acetamide starting material is treated with phosphorous oxychloride in an inert organic solvent, such as benzene, methylene chloride, or the like. This reaction effects ring closure to the corresponding 3,4-dihydro-$\Delta^{1(2H),\alpha}$-isoquinoline acetonitrile or 3,4,5,6,7,8 - hexahydro-$\Delta^{1(2H),\alpha}$-isoquinoline acetonitrile. Hydration to the corresponding carboxamide is then effected by treatment with aqueous hydrogen chloride. In still another process embodiment, phosphorus pentoxide is used as the ring closure agent and hydration of the so-obtained acetonitrile to the corresponding carboxamide is once again effected by use of aqueous hydrogen chloride. The treatment with phosphorus pentoxide is suitably effected in an inert organic solvent such as methylene chloride, benzene or toluene.

Also included within the scope of the present invention are novel intermediates utilized and/or formed in the above-described processes.

The compounds of Formulae I and II above are medicinally useful substances. Both the base compounds of Formulae I and II and the medicinally acceptable acid addition salts of Formulae III and IV are useful as antiviral agents, particularly against Coxsackie A–23 virus (ECHO 9), vaccina virus, encephalo myocarditis virus (Col-SK) and herpes virus. The compounds are, thus, particularly useful for the treatment of infections of viral origin, especially against upper respiratory infections, enteric infections and local herpetic infections. Coupled with the chemotherapeutic activity of these compounds is a low order of toxicity.

The compounds, i.e., the bases of Formulae I and II and the medicinally acceptable acid addition salts of Formulae III and IV can be administered internally, for example, orally or parenterally, in conventional pharmaceutical administration forms. Thus, they can be administered in solid administration forms such as tablets, capsules, lozenges, dragees, or the like, or in liquid forms such as emulsions, suspensions, solutions, or the like. Furthermore, the compounds can be admixed with conventional pharmaceutical carriers and adjuvants.

The following examples are illustrative but not limitative of the invention. All temperatures are stated in degrees centigrade, and are corrected. The petroleum ether used had a boiling range of 30–60° C.

*Example 1*

18.82 g. of N-(β-phenethyl)-cyanoacetamide was combined with 200 g. of polyphosphoric acid. The viscous mixture was heated to 40° and stirred at this temperature until homogeneity was observed. The solution was then heated by a wax bath (112°) and the reaction mixture held at 99–102° for 6 hours with vigorous stirring. The clear hot reaction mixture was poured on 0.5 kg. of ice, the reaction flask washed with water (300 ml.), the aqueous solutions combined, and the resulting mixture stirred for 2 hours. A homogeneous suspension resulted. After standing overnight, insoluble material (N-phenethylmalonamide) was filtered off and washed with a small amount of water. The filtrate was 3 times vigorously extracted with methylene chloride (portions of 600 ml.). The methylene chloride extracts were then washed with 400 ml. of water. The aqueous layers were combined (total volume ca. 1.2 l.), and the resulting solution vigorously stirred and flushed with nitrogen for one hour in order to remove methylene chloride completely. Subsequently, the solution was carefully neutralized by dropwise addition of 320 ml. of a sodium hydroxide solution (200 g. sodium hydroxide in 400 ml. water) with thorough stirring while holding the temperature of the solution at 20°. Crystalline product, 3,4-dihydro-$\Delta^{1(2H),\alpha}$-isoquinolineacetamide was slowly precipitated during this neutralization. The pH of the solution was 6.7. The suspension was stirred for an additional hour and then filtered. The material remaining on the filter was washed twice with small amounts of water, and the filtrate discarded. The crude, wet material was dissolved in 200 ml. of methylene chloride and the solution dried over magnesium sulfate. Removal of the drying agent and solvent left a syrup which was dissolved in 600 ml. of methanol. The so-obtained solution was diluted with 600 ml. of ether, followed by a dropwise addition with stirring of 6 ml. of 7.4 N freshly prepared methanolic hydrogen chloride. The precipitated, crystalline hydrochloride was filtered off, washed with a small amount of ether and dried to constant weight in vacuo, affording a residue which was dissolved in approximately 50 ml. of methanol. A small amount of insoluble material was filtered off, and the clear filtrate was heated to boiling on a steam bath. Upon the careful addition of 180 ml. of absolute ether, spontaneous crystallization occurred. The solution was quickly removed from the steam bath and allowed to come to room temperature. After 2 hours, the crystals (long, colorless needles) were filtered off, washed with 20 ml. of a methanol-ether mixture (1:10) and dried in vacuo to constant weight, yielding 3,4 - dihydro - 1 - isoquinolineacetamide hydrochloride. Concentration of the mother liquor and subsequent crystallization from methanol-ether afforded an additional amount of this hydrochloride. 3,4 - dihydro - 1 - isoquinolineacetamide hydrochloride was found to exist in two different crystal forms, needles melting at 187–191° (dec., in vacuo, under $N_2$) and prisms melting at 187–190° (dec., in vacuo, under $N_2$). These modifications were easily interconverted by crystallization from methanol-ether. In order to produce a distinct crystal form, either needles or prisms, the solution was seeded with a specimen of the desired modification.

*Example 2*

1.70 g. of 3,4-dihydro-1-isoquinolineacetamide hydrochloride and 20 ml. of water were stirred at room temperature, and 7.6 ml. of 1.0 N. sodium hydroxide was added thereto dropwise, in order to neutralize the so-formed hydrochloric acid. In the course of this neutralization, crystalline base was formed. After the addition of sodium hydroxide was completed, the suspension was allowed to stir for an additional 5 minutes. The crystals were then filtered off, washed with water and dried over calcium chloride in vacuo, yielding 3,4-dihydro-$\Delta^{1(2H),\alpha}$-isoquinolineacetamide melting at 106.5–107.5° (in vacuo). A sample of 3,4-dihydro-$\Delta^{1(2H),\alpha}$-isoquinolineacetamide was dissolved in a mixture of ethanol-ether, and ethanolic hydrogen bromide added thereto. The precipitated hydrobromide was filtered off and recrystallized twice from ethanol affording 3,4-dihydro-1-isoquinolineacetamide hydrobromide melting at 186–187° (dec.).

*Example 3*

N-phenethylmalonamide was isolated as a by-product in the preparation set forth in Example 1 above. As described therein N-phenethylmalonamide was obtained by filtration of the homogeneous suspension which resulted when the reaction mixture was poured on ice and stirred overnight. The water-washed methylene chloride extracts from the remaining solution were combined, and dried over magnesiums sulfate. Removal of the solvent under reduced pressure left a residue which was crystallized from methylene chloride-ether, affording further N-phenethylmalonamide. Concentration and crystallization of the mother-liquor gave still an additional crop. A sample of the compound, twice crystallized from ethanol, melted at 124.5–125°. A mixture of N-phenethylmalonamide and polyphosphoric acid was treated the same way as described in Example 1 above for a mixture of polyphosphoric acid and N-(β-phenethyl)-cyanoacetamide. The work-up according to the so-described procedure afforded material which was identical in all respects (M.P., mixture-M.P. and infrared spectrum) with the 3,4-dihydro-1-isoquinolineacetamide hydrochloride obtained by the process set forth in Example 1.

*Example 4*

1.0 g. of 3,4-dihydro - $\Delta^{1(2H),\alpha}$ - isoquinolineacetonitrile was dissolved in 5 ml. of concentrated hydrochloric acid (magnetic stirring). After standing at room temperature for 16 hours, the solution was neutralized with 60 ml. of 1 N sodium hydroxides. The suspension formed was twice extracted with methylene chloride-ether, the organic phase washed with water, and dried over magnesium sulfate. Removal of the solvent in vacuo was followed by dissolution of the residue in a methanol-ether mixture and by addition of 1 ml. of 7.3 N methanolic hydrogen chloride, which resulted in the precipitation of the hydrochloride. This material was recrystallized from methanol-ether affording 3,4-dihydro-1-isoquinolineacetamide hydrochloride which was in all respects (M.P., mixture-M.P. and IR-spectrum) identical with a sample prepared according to the procedure set forth in Example 1 above.

*Example 5*

10.0 g. of 3,4-dihydro-6,7-dimethoxy-$\Delta^{1(2H),\alpha}$-isoquinolineacetonitrile was dissolved in 50 ml. of concentrated hydrochloric acid (magnetic stirring). After standing at room temperature for 16 hours, the solution was neutralized by addition of 300 ml. of 2 N sodium hydroxide. After a further addition of sodium bicarbonate, the solution was extracted with methylene chloride, the organic phase washed with water, and dried over sodium sulfate. The filtered solution was taken to dryness, and the residue crystallized from a methylene chloride-ether mixture affording 3,4-dihydro-6,7-dimethoxy-$\Delta^{1(2H),\alpha}$-isoquinolineacetamide, which was recrystallized from methylene chloride-ether, M.P. (in vacuo) 163–164° (dec.).

8.37 g. of 3,4-dihydro-6,7-dimethoxy-$\Delta^{1(2H),\alpha}$-isoquinolineacetamide was dissolved in 100 ml. of methanol, and approximately 500 ml. of ether added to this solution. Dropwise addition of methanolic hydrogen chloride to the stirred solution precipitated 3,4-dihydro-6,7-dimethoxy-1-isoquinolineacetamide hydrochloride. The mixture was stirred for one additional hour after the addition of acid had been completed. The material was then filtered off and dried in vacuo yielding 3,4-dihydro-6,7-dimethoxy-1-isoquinolineacetamide hydrochloride as the residue. Concentration and crystallization of the mother liquor gave an additional yield of this material. A sample recrystallized from methanol-ether melted (in vacuo) at 203° (dec.).

*Example 6*

A mixture of 187.8 g. of 2-(1-cyclohexen-1-yl)-ethylamine and 297.3 g. of methyl cyanoacetate was heated for 6 hours at 135° on an oil bath. The mixture was then dissolved in 200 ml. of hot ethanol and allowed to cool. The crystals formed were filtered off, washed with a small amount of cold ethanol and dried in vacuo to constant weight yielding N-[2-(1-cyclohexen-1-yl)-ethyl]-2-cyanoacetamide. The mother liquor was concentrated under reduced pressure and taken to complete dryness by means of high vacuum. The residual viscous syrup was crystallized from hot ethanol, affording a second crop of N-[2-(1-cyclohexen-1-yl)-ethyl]-2-cyanoacetamide. Concentration of the mother liquor and subsequent crystallization from ethanol gave still additional N-[2-(1-cyclohexen-1-yl)-ethyl]-2-cyanoacetamide. A sample of the product twice recrystallized from ethanol-water melted at 69°.

20.0 g. of N-[2-(1-cyclohexen-1-yl)-ethyl]-2-cyanoacetamide was dissolved in 200 ml. of methylene chloride and 20 g. of phosphorous pentoxide then added thereto with stirring. The resulting mixture was stirred for 66 hours at room temperature, then poured on 600 g. of ice and, after the addition of 60 ml. concentrated ammonium hydroxide (with cooling), three times extracted with ether. The organic phase was dried over sodium sulfate and taken to dryness at room temperature by means of a rotary evaporator. The residue was dissolved in methylene chloride-ether (1:3) and extracted three times with 2 N hydrochloric acid in portions of 200 ml. The combined aqueous extracts were made basic by addition of ammonium hydroxide with cooling, followed by extraction with methylene chloride-ether. The organic phase was washed neutral with water, dried over sodium sulfate and taken to dryness under reduced pressure. The residue was crystallized from ether solution at low temperature by means of Dry Ice-acetone cooling, affording 3,4,5,6,7,8-hexahydro-$\Delta^{1(2H),\alpha}$-isoquinolineacetonitrile. Concentration of the mother liquor and subsequent crystallization gave a second crop of crystals of the product. A sample, recrystallized from ether-petroleum ether, melted at 120.5–121.5°.

523 mg. of 3,4,5,6,7,8-hexahydro-$\Delta^{1(2H),\alpha}$-isoquinolineacetonitrile was dissolved in 250 ml. of ether. To the stirred solution, 1 ml. of ethanolic perchloric acid (0.4 ml. of 70 percent perchloric acid made up to 1.0 ml. with ethanol) was added dropwise. A yellow oil formed which crystallized gradually after the addition of perchloric acid had been completed. The crystals were filtered off, washed with ether and dried, affording 3,4,5,6,7,8-hexahydro-1-isoquinolineacetonitrile perchlorate which after being twice recrystallized from methanol-ether melted at 134–134.5°.

*Example 7*

1.0 g. of 3,4,5,6,7,8-hexahydro-$\Delta^{1(2H),\alpha}$-isoquinolineacetonitrile was dissolved in 5 ml. of concentrated hydrochloric acid and the solution allowed to stand for 16 hours. Then, 60 ml. of 1 N sodium hydroxide was added dropwise to the stirred solution. The crystals formed were filtered off, washed with a small amount of cold water and dried in vacuo to constant weight, affording a yellow material approximately half of which was dissolved in 20 ml. of ether, the turbid solution treated with decolorizing charcoal, filtered and dried over magnesium sulfate. Concentration of the colorless solution and crystallization from ether-petroleum ether gave 3,4,5,6,7,8-hexahydro-$\Delta^{1(2H),\alpha}$-isoquinolineacetamide as white crystals, M.P. 146–147° (in vacuo).

*Example 8*

3.12 g. of 3,4,5,6,7,8-hexahydro-$\Delta^{1(2H),\alpha}$-isoquinolineacetonitrile was dissolved in 15 ml. of concentrated hydrochloric acid and the solution allowed to stand for 16 hours. Then 180 ml. of 1 N sodium hydroxide was added dropwise to the stirred solution. During the neutralization, a seed of 3,4,5,6,7,8-hexahydro-$\Delta^{1(2H),\alpha}$-isoquinolineacetamide was added to facilitate crystallization. The neutralized solution was stirred for one hour, the crystals forms filtered off, washed with a small amount of cold water and dried in vacuo to constant weight, affording a light yellow material which was dissolved in 800 ml. of ether, insoluble material filtered off and the filtrate subjected to a treatment with decolorizing charcoal. Filtration and removal of the solvent under reduced pressure gave 3,4,5,6,7,8-hexahydro-$\Delta^{1(2H),\alpha}$-isoquinolineacetamide as a colorless residue. The compound was dissolved in 800 ml. of dry ether, the solution cooled by ice and 1 ml. of concentrated methanolic hydrogen chloride added dropwise to the stirred solution. After standing overnight, the precipitate was filtered off and dried affording crude 3,4,5,6,7,8-hexahydro-1-isoquinolineacetamide hydrochlride. This material was dissolved in methanol and treated with decolorizing charcoal. Crystallization from a methanol-ether solution gave 3,4,5,6,7,8-hexahydro-1-isoqinolineacetamide hydrochloride, M.P. (in vacuo) 153.5–155° (dec.).

We claim:

1. A compound selected from the group consisting of compounds of the formulae

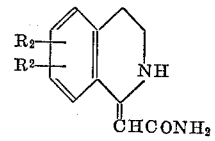

and

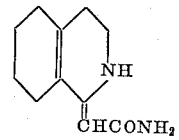

and acid addition salts thereof; wherein $R_1$ and $R_2$ are each selected from the group consisting of hydrogen, lower alkoxy, lower alkyl and, taken together, lower alkylenedioxy.

2. A compound selected from the group consisting of 3,4-dihydro-$\Delta^{1(2H),\alpha}$-isoquinolineacetamide and acid addition salts thereof.

3. A compound selected from the group consisting of 6,7-dimethoxy-3,4-dihydro-$\Delta^{1(2H),\alpha}$-isoquinolineacetamide and acid addition salts thereof.

4. A process for the preparation of compounds of claim 2 which comprises treating at a temperature between about 90° C. and about 150° C., N-($\beta$-phenethyl)-cyanoacetamide with polyphosphoric acid.

5. 3,4,5,6,7,8-hexahydro-$\Delta^{1(2H),\alpha}$-isoquinolineacetonitrile.

6. A process as in claim 5 wherein the treatment is effected at between about 110° C. and about 120° C.

7. 3,4-dihydro-1-isoquinolineacetamide hydrohalide.

8. 3,4-dihydro-1-isoquinolineacetamide hydrochloride.

(References on following page)

References Cited by the Examiner

UNITED STATES PATENTS

| | | | |
|---|---|---|---|
| 2,542,401 | 2/51 | Doyle et al. | 260—283 |
| 2,651,634 | 9/53 | Henecka | 260—283 |
| 2,692,265 | 10/54 | Bruce et al. | 260—287 |
| 2,778,834 | 1/57 | Bruce et al. | 260—287 |
| 2,834,800 | 5/58 | Trapp et al. | 260—464 |
| 2,991,285 | 7/61 | Feely | 260—283 |
| 3,021,331 | 2/62 | Lambardino et al. | 260—287 |
| 3,021,355 | 2/62 | Eiter et al. | 260—464 |

FOREIGN PATENTS 789,789  1/58  Great Britain.

OTHER REFERENCES

Battersby et al.: J. Chem. Soc. (London), 1960, pp. 3474–82, p. 3479 relied on.

Ochia et al.: Chem. Abstracts, vol. 52, col. 14605 (1958).

Osbond: J. Chem. Soc. (London), 1951, pp. 3464–75, pp. 3466 and 3472 relied on.

Uhlig: Angewandte Chemie, vol. 66, pp. 435–436 (1954).

NICHOLAS S. RIZZO, *Primary Examiner.*

IRVING MARCUS, DUVAL T. McCUTCHEN,
*Examiners.*